(12) United States Patent
Agostinelli

(10) Patent No.: US 10,139,296 B1
(45) Date of Patent: Nov. 27, 2018

(54) CENTRIFUGE CALIBRATION APPARATUS

(71) Applicant: Richard Agostinelli, Levittown, NY (US)

(72) Inventor: Richard Agostinelli, Levittown, NY (US)

( * ) Notice: Subject to any disclaimer, the term of this patent is extended or adjusted under 35 U.S.C. 154(b) by 0 days.

(21) Appl. No.: 15/588,171

(22) Filed: May 5, 2017

(51) Int. Cl.
*G01L 5/00* (2006.01)
*B04B 15/00* (2006.01)
*G01L 1/04* (2006.01)

(52) U.S. Cl.
CPC ............ *G01L 5/0071* (2013.01); *B04B 15/00* (2013.01); *G01L 1/046* (2013.01)

(58) Field of Classification Search
CPC ........ G01L 5/0071; G01L 1/046; B04B 15/00
USPC .............. 73/862.621, 1.87, 861.69, 512, 535
See application file for complete search history.

(56) References Cited

U.S. PATENT DOCUMENTS

| | | | | |
|---|---|---|---|---|
| 1,402,729 A * | 1/1922 | Abbe | ...................... | G01L 17/00 73/709 |
| 2,924,092 A * | 2/1960 | Bourns | ................... | G01P 21/00 73/1.38 |
| 3,180,131 A * | 4/1965 | Thompson | .............. | G01P 21/00 73/1.87 |
| 3,561,272 A * | 2/1971 | Davis | ........................ | G01P 1/08 473/233 |
| 3,812,724 A * | 5/1974 | Curtz | ..................... | F16F 15/366 73/458 |
| 4,175,440 A * | 11/1979 | Booth | ........................ | G01L 5/00 73/488 |
| 4,244,513 A * | 1/1981 | Fayer | .................... | B04B 5/0407 388/809 |
| 4,680,043 A * | 7/1987 | Ginter | ..................... | B30B 11/00 264/114 |
| 4,848,158 A * | 7/1989 | Egli | .......................... | G01P 3/22 244/3.21 |
| 5,242,370 A * | 9/1993 | Silver | ................... | B01L 3/5021 422/918 |
| 5,338,283 A * | 8/1994 | Fleming | ................ | B04B 13/003 340/671 |
| 5,382,218 A * | 1/1995 | Uchida | ................. | B04B 13/003 494/10 |
| 5,800,331 A * | 9/1998 | Song | ....................... | B04B 9/146 494/10 |
| 6,722,214 B1 * | 4/2004 | Cole | ..................... | B04B 5/0421 159/25.1 |

* cited by examiner

*Primary Examiner* — Lisa Caputo
*Assistant Examiner* — Nathaniel T Woodward
(74) *Attorney, Agent, or Firm* — Baker and Rannells, PA

(57) ABSTRACT

A centrifuge calibration apparatus (10) configured to be spun in a centrifuge and to provide an indication (25) of performance of the centrifuge. Spinning of the apparatus in the centrifuge causes a piston (14) to exert centrifugal force to compress a spring (22), thereby generating relative movement between a pointer (24) and a scale (26). The scale may be calibrated in units of G-force or RPM. A ratchet mechanism (40) holds the pointer at its most displaced position upon completion of the spinning and removal of the apparatus from the centrifuge.

20 Claims, 5 Drawing Sheets

CENTRIFUGE CALIBRATION APPARATUS

FIELD OF THE INVENTION

This invention relates generally to centrifuge devices such as are used in physician offices and medical laboratories for the testing of blood and other fluids, and it relates specifically to an apparatus for testing the performance of a centrifuge.

BACKGROUND OF THE INVENTION

Hundreds of thousands of centrifuges are operated daily in medical offices and laboratories throughout the United States. A centrifuge contains a rotor which is spun about a drive shaft axis by a motor, for example at speeds of up to 6,000 rpm or more. The rotor is adapted to hold one or more types of fluid containers, such as specimen or blood tubes, polymerase chain reaction (PCR) plates or strip tubes, bottles, bags, etc. A cabinet surrounds and supports these components and protects the operator in the event that a specimen container breaks while the centrifuge is spinning. The speed of rotation of a centrifuge is closely controlled to ensure the generation of a proper G-force on the container for the separation of the fluid into constituent parts. Centrifuges are required by regulation to be calibrated against a National Institute of Standards and Technology (NIST) certified tachometer only once per year, regardless of rigorous daily use or extended periods of non-use. Centrifuges can and do fail between annual checks in ways that are not obvious to the operator, and operator errors resulting in improper fluid separation can occur.

Although centrifuge operation is generally safe and accurate, the consequences of an improperly functioning or improperly operated centrifuge can be significant. For example, Clinical Case Study 62:12 pages 1565-1569, published in 2016 by the American Association for Clinical Chemistry, documents the case of a 12-year old female patient who was improperly treated for hyperammonemia, with resultant adverse side effects, as a result of a centrifuge being set to run at 1200 rpm instead of 1200 G's. The improper setting causes an insufficient G-force to be generated and incomplete separation of blood samples to be achieved, thereby causing false high levels of ammonia to be indicated.

BRIEF DESCRIPTION OF THE DRAWINGS

The invention is explained in the following description in view of the drawings that show.

DETAILED DESCRIPTION OF THE INVENTION

The present inventor has recognized that there is a need for increased assurance that centrifuges are operated properly and are operating correctly, and that any additional regulatory or procedural requirements to achieve such increased assurance must be cost effective. The present inventor has also recognized that annual calibration tests and periodic operator training programs may lose their beneficial impact over time, and that a quick, easy and inexpensive method to periodically confirm proper centrifuge operation is needed. Moreover, while both spin speed (and resultant G-force) and spin time are critical to obtain a proper fluid separation in a centrifuge, the present inventor has recognized that errors in timing are more likely to be noticed by the operator than are errors of spin speed, based simply on the operator's physical ability to perceive time and inability to perceive deviations in spin speed. Accordingly, the present invention is a device which directly measures the G-force generated by a centrifuge. One embodiment of such a device is illustrated in the figures and is described below.

Figure 1:
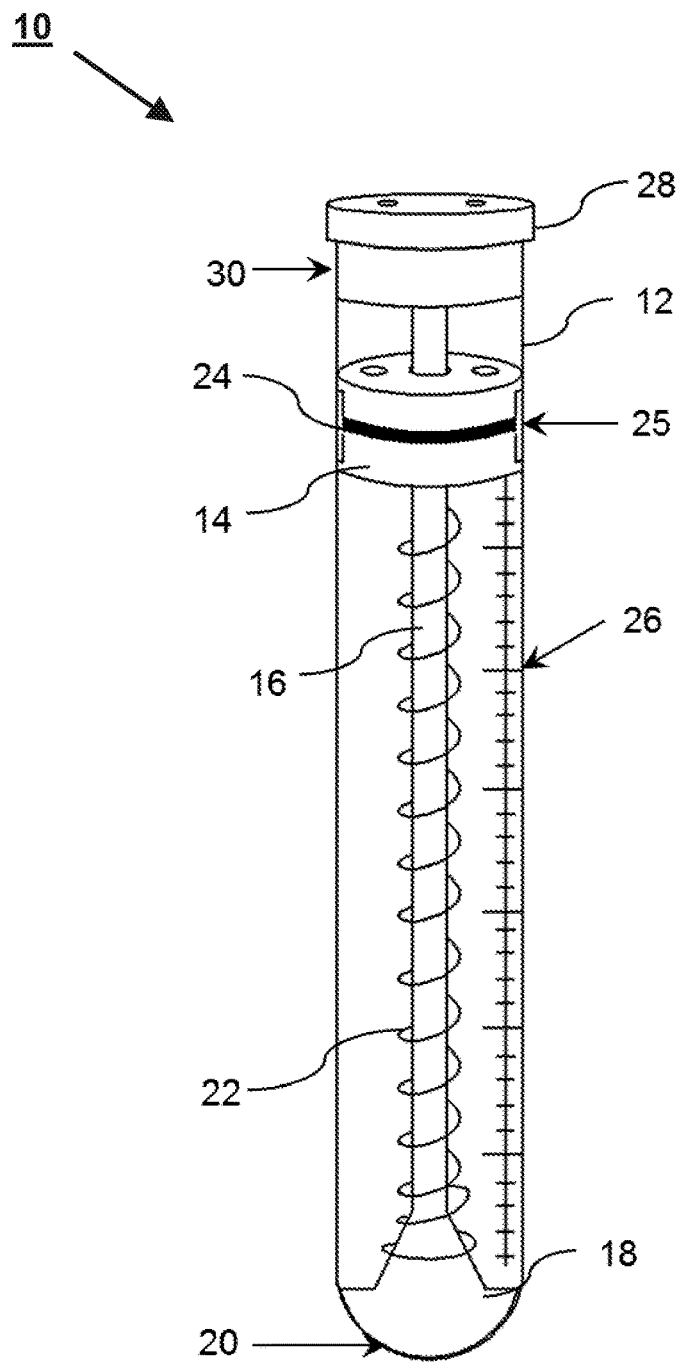
FIG. 1 illustrates a centrifuge calibration spike in accordance with one embodiment of the invention in its pre-use condition.
Figure 2:
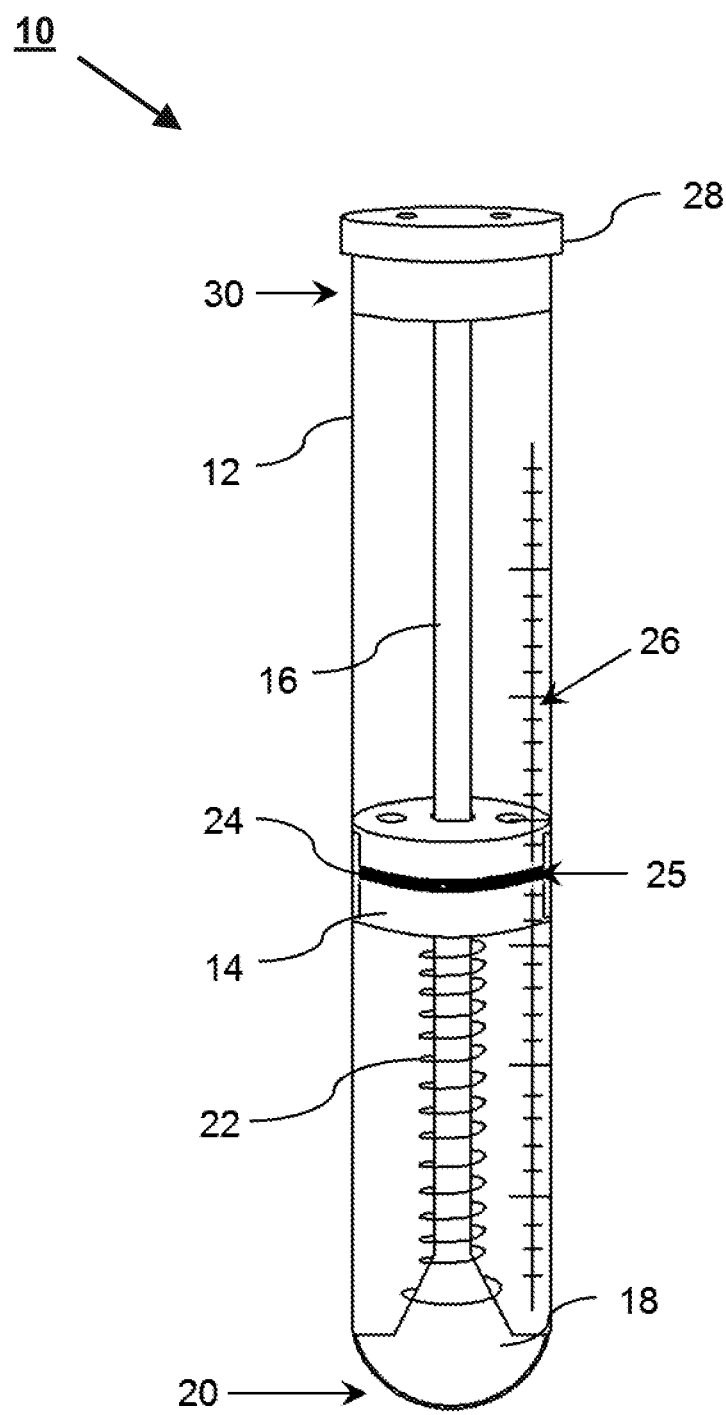
FIG. 2 illustrates the centrifuge calibration spike of FIG. 1 after it has been spun in a centrifuge.

FIG. 1 is a plan view of an apparatus 10 that can be used for testing centrifuge operation. The apparatus 10 is in the general form of a specimen tube and may be referred to as a centrifuge calibration spike, centrifuge calibration stick, Gspike or G-stick. FIG. 1 illustrates the apparatus 10 before it is used to test a centrifuge, and FIG. 2 illustrates the same apparatus 10 after it has been spun in a centrifuge.

Apparatus 10 includes a structural frame upon which other components of the apparatus are supported. In the illustrated embodiment, the frame is a tube, such as a blood specimen tube 12 as commonly used in the medical field. The apparatus 10 is sized to fit into a rotor of a centrifuge (not shown) in the place of a production specimen tube, and it is designed to be spun in the centrifuge as a test device during a test spinning in order to confirm that the centrifuge has achieved a correct spin speed/G-force.

Figures 3, 4:
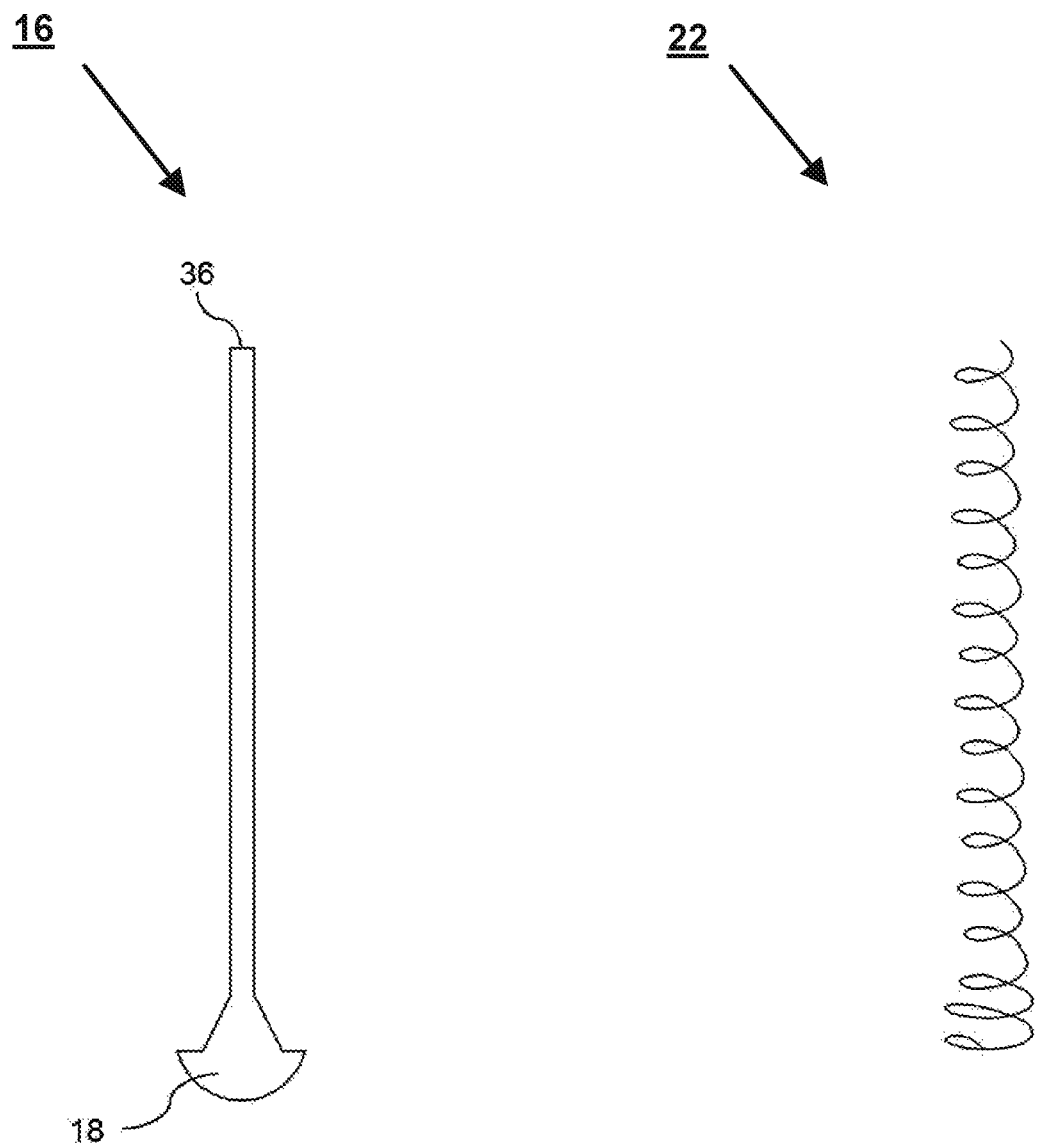
FIG. 3 illustrates the alignment pin of the centrifuge calibration spike of FIG. 1.
FIG. 4 illustrates the spring of the centrifuge calibration spike of FIG. 1.

Apparatus 10 also includes an element that is moveable relative to the frame under the influence of a G-force exerted on the apparatus 10 by a centrifuge. In the illustrated embodiment, the moveable element is a piston 14 disposed within the tube 12. Piston 14 is supported in the tube 12 and is maintained centered and in alignment with a longitudinal axis of the tube 12 by an alignment pin 16. The piston 14 is free to slide along the pin 16. Other embodiments may not require an alignment pin. The alignment pin 16 is separately illustrated in FIG. 3, where it can be seen that the alignment pin 16 of the illustrated embodiment includes an integrally formed anchor 18 shaped to fit within a bottom 20 of the tube 12 to provide mechanical support in directions perpendicular to the longitudinal axis. Other embodiments may include a separately formed anchor or other structure to support the elongated portion of the alignment pin.

Movement of the piston 14 within the tube 12 is determined by a balance of forces acting on the piston 14. In a static condition prior to being spun in a centrifuge, as illustrated in FIG. 1, the piston 14 is urged to a zero G resting or starting position by the action of a flexible object such as spring 22. Spring 22 is a tapered helical compression spring as illustrated separately in FIG. 4, sized to fit over and to be concentric with the alignment pin 16. Under the influence of centrifugal force while being spun in a centrifuge, the mass of piston 14 urges a compression of spring 22, allowing piston 14 to move toward the bottom 20 of tube 12. The amount of displacement of the spring 22 and piston 14 will be directly related to the spinning speed of the centrifuge and can be calculated using known equations and techniques, and/or can be determined experimentally. Other embodiments may deform a flexible object in tension or in a bending direction as the spin speed is increased.

Other embodiments of the invention may utilize different types of flexible objects to deform in response to an imposed G-force, such as a different type or shape of mechanical spring, a gas spring or other compressible fluid device, rubber or other elastic material, or a deformable/non-elastic material. The deformation of the flexible object may be due to the action of the centrifuge on the mass of the flexible object alone (i.e. the object deforms under its own weight), or the deformation may be augmented by the action of the centrifuge on the mass of the piston.

The deformation of the flexible object during test spinning of the centrifuge must be made easily perceptible and interpretable by the operator. In the illustrated embodiment, an indicator 25 of displacement of the piston 14 relative to the tube 12 under the influence of a G-force during testing of the centrifuge is provided in the form of a pointer 24 and a scale 26. The pointer 24 is illustrated as a line marked on the piston 14, although it may alternatively be a perceptible joint between two materials or a mechanical indentation or other marking on the piston 14. The scale 26 may be painted, engraved or otherwise attached to or marked on the tube 12, either at a fixed location or in an adjustable location which allows for some calibration of the device. The scale may be marked in units of G-force, as shown, or in RPM or in a percentage or other unitless range, or it may show a simple go/no-go or pass/fail demarcation.

Figure 5A:
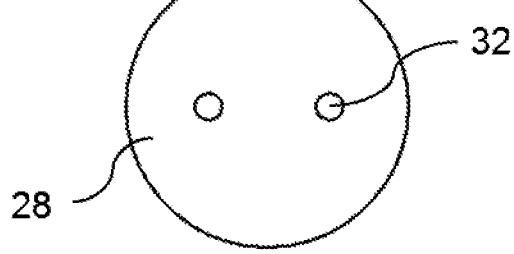
FIGS. 5A-5C are top, side and bottom views respectively of the cap of the centrifuge calibration spike of FIG. 1.
Figure 5B:
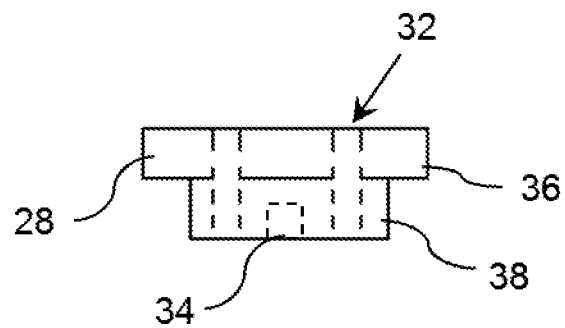
Figure 5C:
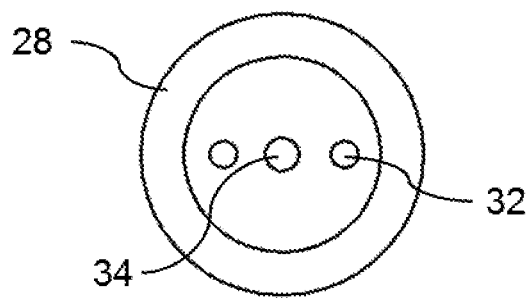

The pre-test resting position of the piston 14 may be determined by a length of the spring 22, or the piston 14 may be urged by the spring 22 against a mechanical stop, such as against a cap 28 inserted into an open top end 30 of the tube 12. Top, plan and bottom views of cap 28 are shown in FIGS. 5A-5C respectively. One or both of the cap 28 and/or piston 14 may be vented with one or more through holes 32. Cap 28 may contain a recess 34 for receiving and supporting a top end 36 of the alignment pin 16. Cap 38 may include an outer flange portion 36 having a diameter large enough to prevent it from being inserted completely into the tube 12, as well as a ribbed portion 38 having a diameter appropriate for snug insertion into the open top end 30 of tube 12.

Figure 6:
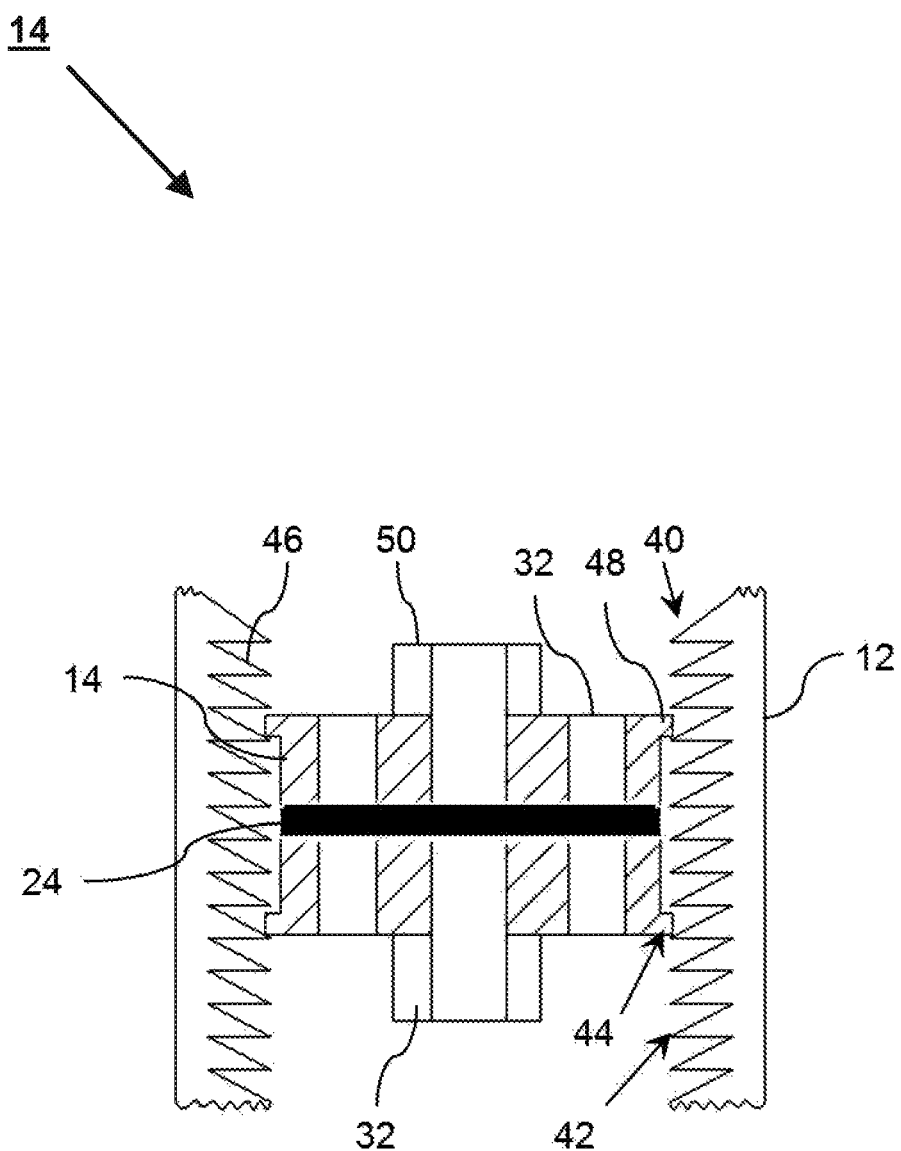
FIG. 6 is a partial cross sectional view of the tube and piston of the centrifuge calibration spike of FIG. 1, illustrating its rack and pawl ratchet mechanism.

If the position of marker 24 is visible or otherwise recordable while the apparatus 10 is being spun in a centrifuge, the piston 14 may be free to move back and forth along the alignment pin 16 under a changing centrifugal force, and the performance of the centrifuge can be assessed by recording the pointer location during the spin test. However, in most centrifuge designs, the specimen tube is not perceptible during operation of the centrifuge. Accordingly, apparatus 10 is provided with a ratchet mechanism 40, as illustrated in FIG. 6, which permits the piston 14 to move toward the tube bottom 20 as the G-force on the apparatus increases, but which prevents a return movement of the piston 14 back toward the top 30 of the tube 12 as the G-force is reduced. In this manner, the position of the pointer 24 will correspond to the maximum G-force/spin speed achieved during a test of a centrifuge, such as is illustrated in FIG. 2. The ratchet mechanism 40 includes a rack 42 and an interfacing pawl 44. The rack 42 in this embodiment is formed as a plurality of downwardly facing tapered ribs 46 extending around an inside diameter surface of the tube 12. The pawl 44 in this embodiment is formed as a plurality of retaining wedges 48 extending from a top and bottom surface of the piston 14. The retaining wedges 48 will deform to move past the tapered surface of the ribs 46 as the piston 14 is moved toward the bottom of the tube 12, but they will catch against the flat surface of the ribs 46 and thereby prevent movement of the piston 14 upwardly toward the top 30 of the tube 12. In this manner the piston 14/pointer 24 will be retained in a position of greatest deformation experienced during a spin test of a centrifuge, as shown in FIG. 2.

Other embodiments of ratchet mechanisms may be envisioned for other embodiments of the invention, for example a gear/pawl mechanism. Moreover, if a non-elastic flexible member is used, or if the position of the pointer 24 can be determined while the test apparatus is spinning, no ratchet mechanism may be needed. Moreover, in some embodiments the pointer itself may be moveable only in a direction of increasing G force, and it may act to passively stay at a position of maximum G force even when the piston returns to a lower G force or resting position.

Structures of apparatus 10 may be formed of common, inexpensive and easily fabricated materials such as glass, plastics and metals. For example, the tube 12 may be made of glass or plastic or other transparent material facilitating the visibility of the pointer 24 through the wall of the tube 12. The spring 22 may be formed of a spring steel or nonferrous material, for example. The cap 28, alignment pin 16 and piston 14 may be formed of plastic or metal. If the mass of the piston 14 is desired to be increased, a supplemental weight 50, such as metal, may be added to increase the centrifugal force developed during a spin test. A number of different supplemental weights may be provided to be interchangeable in the testing apparatus to change the measurement range of the apparatus. Different supplemental weights may be given respective different colors, and the apparatus may be provided with different color coded scales or different color coded pointers corresponding to the color of the respective interchangeable weights to guide the operator to read the correct corresponding range on the scale.

Dimensional tolerances of the component parts of apparatus 10 may affect the accuracy and repeatability of the measured and indicated G-force, however, no more than standard manufacturing tolerances are expected to be needed to achieve the purpose of confirming proper operation and performance of a centrifuge. Important performance variables include but are not necessarily limited to the free movement of the piston along the alignment pin, the spring constant of the spring, and the amount of backlash allowed by the ratchet mechanism. Sample testing of each lot of devices manufactured may be used to verify that a desired accuracy is maintained.

Differently sized tubes may be needed to test different centrifuges, such as 16×100 mm, 13×100 mm, and 13×75 mm, for example. A smaller device may be used with an adapter for a larger application. Other embodiments of the invention may utilize a frame in the shape of other types of fluid containers that are spun in a centrifuge, for example but not limited to a PCR plate or strip. A device in accordance with the present invention may be sized to be a direct substitute for a fluid container that is used during production operation of the centrifuge, although it may also be envisioned that a testing device of any shape may be used together with an appropriate adapter to mate the testing device with the rotor of the centrifuge to be tested. Different devices may also be needed to test for different ranges of G-forces, such as one model for 300-2,500 G and another model for 2,500-7,000 G.

The owner/operator of a centrifuge may desire run a test of the centrifuge at appropriate intervals to ensure proper operation/performance of the centrifuge, such as periodically (e.g. daily, weekly or monthly, or after a predetermined number of uses of the centrifuge) or upon making any change to a setting of the centrifuge (e.g. a rotation speed change) or each time a different operator uses the centrifuge. It is anticipated that a testing apparatus built in accordance with the present invention will have a relatively low cost and would be considered a single-use disposable device in order to ensure accurate test results. The apparatus is simply placed into the centrifuge in the same manner as a patient sample and spun in accordance with the standard operating procedure for a patient sample. During or upon completion of the spin test, the indicator is observed to determine the G-force/spin speed achieved. The scale on the device may indicate G-force or RPM directly, or it may provide an indirect reading that can be converted to G-force or RPM via a conversion chart, or it may provide a go/no-go indication. If an unacceptable reading is obtained, the centrifuge may be removed from service immediately and/or other corrective action taken.

It is noted that the term "piston" as used herein is meant to include any structure that moves within the frame as a result of centripetal force acting on the frame by a centrifuge, the piston thereby exerting centrifugal force onto a flexible object in response to a speed of rotation of the centrifuge, whether the piston is cylindrical in cross section or of other shape, and whether the piston is supported by surrounding frame walls and/or by an alignment pin and/or otherwise. The piston is a structure that has a mass/weight of its own, and that mass/weight and the corresponding centrifugal force exerted by the piston may be augmented by a separate structure or "weight" attached to or otherwise connected with the piston.

Moreover, the term "supported by" as used herein is meant to include being directly or indirectly attached or being sufficiently urged against to avoid relative displacement.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus for testing centrifuge operation, the apparatus comprising:
   a tube sized to fit into a rotor of a centrifuge;
   a spring supported within the tube;
   a piston supported by the spring within the tube, the piston operable to exert a centrifugal force against the spring when the tube is spun in the centrifuge; and
   an indicator responsive to a displacement of the piston resulting from the centrifugal force.

2. The apparatus of claim 1, further comprising an alignment pin extending along a longitudinal axis of the tube, the spring being concentric with the alignment pin and the piston displaceable along a longitudinal axis of the alignment pin.

3. The apparatus of claim 2, further comprising an anchor disposed within the tube, a first end of the alignment pin supported by the anchor.

4. The apparatus of claim 3, further comprising a cap inserted into an end of the tube, a second end of the alignment pin supported by the cap.

5. The apparatus of claim 1, further comprising a weight attached to the piston.

6. The apparatus of claim 1, wherein the indicator further comprises:
   a scale supported by the tube; and
   a pointer moveable with the piston relative to the scale.

7. The apparatus of claim 6, wherein the scale is marked in units of G force.

8. The apparatus of claim 1, further comprising a ratchet mechanism operable to hold the piston at a position of maximum displacement resulting from the centrifugal force.

9. The apparatus of claim 1, further comprising a ratchet mechanism comprising:
   a rack structure on an inside surface of the tube; and
   a pawl structure positioned on the piston to engage the rack structure as the piston is displaced.

10. The apparatus of claim 1, wherein the piston is vented.

11. An apparatus for testing centrifuge operation, the apparatus comprising:
    a frame configured for insertion into a centrifuge rotor;
    a flexible object supported by the frame, the flexible object operative to deform when the frame is spinning in the centrifuge rotor; and
    an indicator operative to indicate deformation of the flexible object resulting from the spinning in the centrifuge rotor.

12. The apparatus of claim 11, wherein the flexible object comprises a spring.

13. The apparatus of claim 11, further comprising a mass supported by the elastic object and operative to exert a centrifugal force onto the flexible object during the spinning in the centrifuge rotor.

14. The apparatus of claim 13, wherein the frame comprises a tube and the mass comprises a piston disposed within the tube.

15. The apparatus of claim 14, further comprising an alignment pin supported within the tube, the piston slidably displaceable along the alignment pin in response to the centrifugal force.

16. The apparatus of claim 15, wherein the alignment pin is supported at a first end by an anchor disposed within the tube, and is supported at a second end by a cap adapted to fit into an end of the tube.

17. The apparatus of claim 15, wherein the flexible object comprises a spring supported within the tube and concentric with the alignment pin.

18. The apparatus of claim 17, wherein the indicator comprises:
    a scale supported by the tube; and
    a pointer supported by the piston.

19. The apparatus of claim 18, further comprising a ratchet mechanism operable to hold the piston in a most-displaced position resulting from the centrifugal force.

20. The apparatus of claim 19, wherein the ratchet mechanism comprises:
    a rack supported by the frame; and
    a pawl supported by the piston.

* * * * *